Nov. 23, 1926.  
R. T. PULLEN  
AUTOMOBILE TRAFFIC SIGNAL  
Filed Feb. 5, 1926  
1,608,137
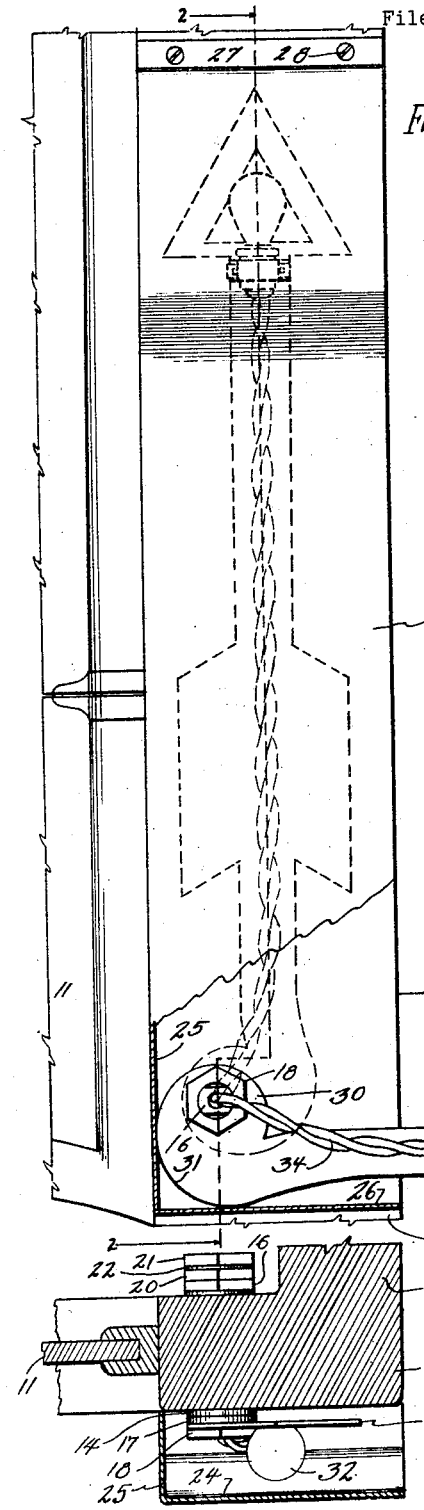
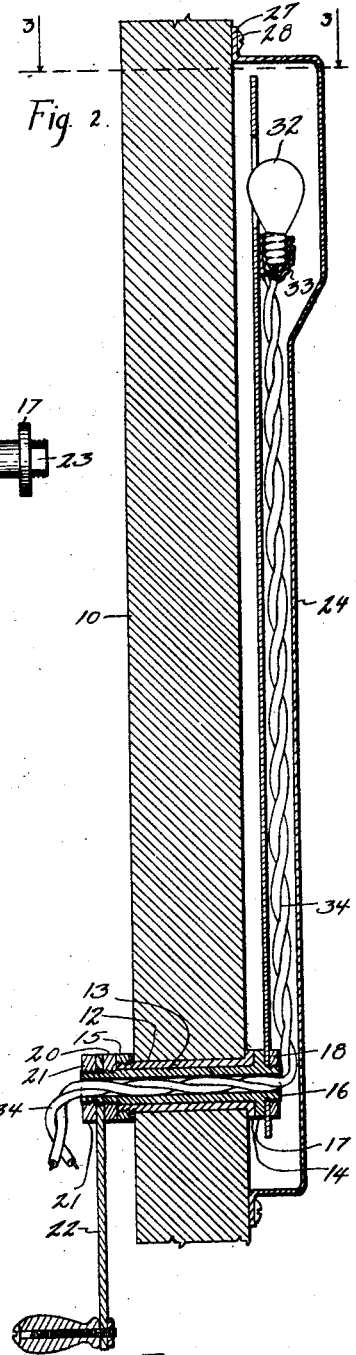
Fig. 1.  Fig. 2.  Fig. 4.  Fig. 3
Inventor  
Roy T. Pullen Patented Nov. 23, 1926.

1,608,137

UNITED STATES PATENT OFFICE.

ROY T. PULLEN, OF SPENCER, IOWA.

AUTOMOBILE TRAFFIC SIGNAL.

Application filed February 5, 1926. Serial No. 86,173.

My invention relates to an automobile traffic signal, and it is my object to provide such a device which is of simple, durable and inexpensive construction.

More particularly, it is my object to provide a signal having an arm which is adapted to be attached to the windshield post of a vehicle and to move from position where it is aligned with said post to a horizontal position extending away from the side of the vehicle.

A further object is to provide a signal having such a signal arm, provided with means for readily attaching it to such a post, said means adapted to be extended through the post and to be operated from the interior of the car for swinging the signal arm from inoperative to operative position.

Another object of my invention is to provide a signal having a signal arm of width substantially equal to the ordinary windshield post, so as to obtain a maximum indicating surface, and which is so constructed that its pivoting member may extend through the post at one side of the center thereof near the windshield, so that the operation of the signal from the interior of the enclosed vehicle will not be interfered with by the side wall of said vehicle.

A still further object is to so construct the signal that the means allowing the pivoting member to be so offset relative to the post will also serve, in connection with a side wall of a casing covering the signal arm, to limit the movement of the arm to the horizontal position above mentioned.

A still further object is to provide a signal having a signal arm provided with an electric lamp, energized by means of conducting wires extending through the pivoting member of the signal arm, a shell being provided to form, together with the windshield post, a casing to receive the signal arm.

With these and other objects in view, my invention consists in the construction, arrangement and combination of the various parts of my device, whereby the objects contemplated are attained, as hereinafter more fully set forth, pointed out in my claims and illustrated in the accompanying drawings, in which:

Fig. 1 is a front elevation of a portion of a windshield post and adjacent windshield with my signal attached thereto, parts being broken away to better illustrate the construction.

Fig. 2 is a vertical sectional view taken on the line 2—2 of Fig. 1, the signal arm being shown in raised position.

Fig. 3 is a transverse sectional view taken on the line 3—3 of Fig. 1, and

Fig. 4 is a detail sectional view of a part of the pivoting means.

I am aware that it is not new to provide a signal to be used in connection with an automotive vehicle for indicating to the traffic the intention of a driver to turn or stop, and am aware, also, that it is not new to operate such a signal from the interior of a closed car. However, by providing the signal, which I will now describe, I obtain the advantages of extreme simplicity, ease of attachment and attachment in such a manner that the signal will project beyond the side of the vehicle and yet will not interfere with the vision of the driver.

I accomplish this by mounting the signal on the forward face of the windshield post, 10, of the vehicle. The windshield is illustrated at 11. A hole, 12, is drilled through the post, from front to rear, at one side of the center thereof. A bushing, 13, is provided, which has at one end a shoulder, 14, and is threaded at the other end to receive a nut, 15. The bushing, 13, is extended through the opening, 12, and secured in place by means of the nut, 15.

A sleeve, 16, is journaled in the bushing, 13, and is provided at one end with a shoulder, 17, beyond which projects a threaded portion to receive the nut, 18. Between the shoulder, 17, and nut, 18, is secured the signal arm, 19, which is preferably made of sheet metal in the shape indicated in dotted lines in Fig. 1.

To the inner end of the sleeve, 16, is secured, between nuts, 20 and 21, a crank lever, 22, by means of which the signal arm is actuated from the interior of the car. In order to prevent rotation of the lever, 22, and arm, 19, relative to the sleeve, the ends of the sleeve may be flattened, as at 23 in Fig. 4, and the arm and lever provided with correspondingly shaped openings to receive the flattened portions.

It will be seen that the signal arm may be installed in a few moments by simply boring an opening in the post, 10, and inserting the bushing and sleeve in place, after which the crank lever, 22, may be secured thereto. If desired, the arm, 19, may be secured permanently to the sleeve, 13.

A shell, 24, having the side wall, 25, and the upper and lower walls, 26, terminating in flanges, 27, is secured to the post, 10, by means of screws, 28, extended through the flanges, 27. The shell, 24, is of the same width as the post, 10, and the post serves as one side of a casing which the shell forms therewith.

The object in positioning the bushing, 13, and sleeve, 16, adjacent the side of the post next the windshield is to center the same relative to the inner face of the post, which is much narrower than the outer face thereof, due to the fact that in the ordinary enclosed vehicle the side wall, 29, is formed integrally with the post, as indicated in Fig. 3. It is desirable, however, to have a signal arm of as great a width as can be conveniently hidden behind the post, 10, and a signal arm is therefore provided with an offset portion, 30, by means of which it is secured to the sleeve, 16. The offset portion is formed with a spiral shaped edge, 31, and the side wall, 25, is so positioned relative to the sleeve, 16, that this edge, 31, will contact therewith when the signal arm is nearing horizontal position. By virtue of the cam shape of the edge, 31, the pressure induced by this contact will gradually increase, and the arm will thus be stopped gradually without jarring.

This will insure the electric lamp, 32, which is secured in a socket, 33, on the end of the signal arm, remaining in working order.

Wires, 34, extend from the socket, 33, and through the sleeve, 16. The wires, 34, are connected to a source of current, preferably in the same circuit with the headlights of the vehicle, so that the lamp, 32, will remain constantly illuminated while the headlights are on.

When a motorist desires to turn, he simply moves the lever, 22, inwardly toward the center of the vehicle, and upwardly, which will cause the arm, 19, to swing outwardly and downwardly into view from the front and rear of the vehicle.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. A vehicle signal including a casing disposed vertically, a signal arm normally contained within the casing in a vertical position and pivoted therein for movement from said vertical position to a position projecting horizontally from the casing, said arm having a cam shaped portion adapted to gradually engage a wall of the casing as the arm approaches said horizontal position, and to limit the movement of the arm at said horizontal position.

2. A signal for an enclosed vehicle having a windshield post, comprising a casing secured to said post in vertical position, a substantially L-shaped signal arm normally contained within the casing in a vertical position and pivoted therein for movement from said vertical position to a position projecting horizontally from the casing, and means for so pivoting the arm, said means being secured to the short leg of the L and extended through the post near the inner side thereof so as to center the signal within the casing when in its vertical position, the short leg of the L being adapted to engage the wall of the casing to limit the movement of the arm in said horizontal position.

3. A signal for an enclosed vehicle having a windshield post, comprising a casing secured to said post in vertical position, a substantially L-shaped signal arm normally contained within the casing in a vertical position and pivoted therein for movement from said vertical position to a position projecting horizontally from the casing, and means for so pivoting the arm, said means being secured to the short leg of the L and extended through the post near the inner side thereof so as to center the signal within the casing when in its vertical position, the short leg of the L being cam shaped and adapted to gradually engage a wall of the casing as the arm aproaches said horizontal position, and to limit the movement of the arm at said horizontal position.

Signed at Spencer, in the county of Clay and State of Iowa, this 30th day of January, 1926.

ROY T. PULLEN.